US011908240B2

(12) United States Patent
Tao et al.

(10) Patent No.: US 11,908,240 B2
(45) Date of Patent: Feb. 20, 2024

(54) MICRO-EXPRESSION RECOGNITION METHOD BASED ON MULTI-SCALE SPATIOTEMPORAL FEATURE NEURAL NETWORK

(71) Applicant: INSTITUTE OF AUTOMATION, CHINESE ACADEMY OF SCIENCES, Beijing (CN)

(72) Inventors: Jianhua Tao, Beijing (CN); Hao Zhang, Beijing (CN); Bin Liu, Beijing (CN); Wenxiang She, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 340 days.

(21) Appl. No.: 17/471,384

(22) Filed: Sep. 10, 2021

(65) Prior Publication Data
US 2022/0269881 A1   Aug. 25, 2022

(30) Foreign Application Priority Data
Feb. 19, 2021   (CN) .......................... 202110188615.1

(51) Int. Cl.
*G06V 40/16*   (2022.01)
*G06N 3/049*   (2023.01)
*G06F 18/214*   (2023.01)

(52) U.S. Cl.
CPC ........ *G06V 40/176* (2022.01); *G06F 18/2148* (2023.01); *G06N 3/049* (2013.01); *G06V 40/168* (2022.01); *G06V 40/172* (2022.01)

(58) Field of Classification Search
CPC .......................... G06F 18/2148; G06N 3/049
See application file for complete search history.

(56) References Cited

U.S. PATENT DOCUMENTS

| 2019/0163965 A1* | 5/2019 | Yoo ...................... G06V 40/176 |
| 2021/0000404 A1* | 1/2021 | Wang ...................... G16H 30/40 |

OTHER PUBLICATIONS

Apr. 7, 2021 Office Action issued in Chinese Patent Application No. 202110188615.1.
Jun. 2, 2021 Notice of Allowance issued in Chinese Patent Application No. 202110188615.1.
Apr. 28, 2021 Office Action issued in Chinese Patent Application No. 202110188615.1.

* cited by examiner

*Primary Examiner* — Edward Park
(74) *Attorney, Agent, or Firm* — Oliff PLC (57) ABSTRACT

Disclosed is a micro-expression recognition method based on a multi-scale spatiotemporal feature neural network, in which spatial features and temporal features of micro-expression are obtained from micro-expression video frames, and combined together to form more robust micro-expression features, at the same time, since the micro-expression occurs in local areas of a face, active local areas of the face during occurrence of the micro-expression and an overall area of the face are combined together for micro-expression recognition.

10 Claims, 4 Drawing Sheets

MICRO-EXPRESSION RECOGNITION METHOD BASED ON MULTI-SCALE SPATIOTEMPORAL FEATURE NEURAL NETWORK

CROSS-REFERENCE TO RELATED APPLICATION

The present disclosure claims the priority to Chinese Patent Application CN202110188615.1 entitled "Micro-expression recognition method based on multi-scale spatiotemporal feature neural network" filed on Feb. 19, 2021, the entire content of which is incorporated herein by reference.

FIELD OF THE INVENTION

The present disclosure relates to the field of image processing technology, and in particular to a micro-expression recognition method based on a multi-scale spatiotemporal feature neural network, and a readable storage medium and computer device for the same.

BACKGROUND OF THE INVENTION

Micro-expression is a spontaneous expression that is produced when a person is trying to conceal his/her inner emotions and cannot be faked or suppressed. When a certain real emotion is hidden in a person's mind, a micro-expression occurs with general time duration of 1/25-1/3 second. Small motion amplitude and short time duration of the micro-expression poses a huge challenge to human visual recognition. Since the micro-expression is impossible to be faked and suppressed, it can be used as a major basis for judging a person's subjective emotion. With development of facial micro-expression recognition technology, facial micro-expressions can be effectively recognized and interpreted. Capturing human facial micro-expressions and then processing and analyzing them by a database can play a significant role in the fields of anti-terrorism, security check and interrogation, interpersonal communication, and teaching evaluation and feedback.

A micro-expression recognition task refers to identifying a given micro-expression sample as a specific emotion category, which is a core task of automatic micro-expression recognition. Some methods for manually analyzing features of micro-expression include spatiotemporal local binary pattern (LBP), LBP-TOP, directional average of optical flow features, etc. Major drawbacks of these methods lie in problems of, such as most extraction from a video being of superficial information, insufficient extraction of expression features, and lack of information required for abstract feature representation. Patent application publication No. CN110008841A discloses a method and system for constructing a facial expression recognition model, which relates to the field of data processing. The method includes steps of: S1, obtaining a source image and performing preprocessing to obtain a preprocessed image; S2, constructing a deep learning model based on the source image and the preprocessed image, and introducing transfer learning to perform a weighting training on the deep learning model so as to obtain an image pre-trained model; S3, obtaining a fine-tuning model according to the image pre-trained model; S4, performing fine-tuning model training on the pre-processed image by means of the fine-tuning model to obtain an expression recognition model. This provides a solution to the problem of how to improve accuracy of the facial expression recognition model.

Patent application publication No. CN110705430A discloses a multi-person facial expression recognition method and system based on deep learning. The recognition method includes steps of: 1. building an expression recognition model; 2. constructing a training sample set, through which parameters of the expression recognition model are trained; 3. detecting faces in an image to be recognized through a MTCNN network to obtain face areas in the image to be recognized; 4. inputting the detected face areas into the trained expression recognition model for recognition, and obtaining a expression classification result of each face in the image be recognized. This method applies deep learning on the expression recognition so as to rapidly complete the multi-person facial expression recognition task.

SUMMARY OF THE INVENTION

An objective of the present disclosure is to provide a micro-expression recognition method based on a multi-scale spatiotemporal feature neural network, and a readable storage medium and computer device for the same.

In order to achieve these, provided by the present disclosure is as follows.

According to a first aspect of the present disclosure, a micro-expression recognition method based on a multi-scale spatiotemporal feature neural network is provided, which includes steps of:

S1, obtaining a collection of micro-expression videos, and converting the collection of micro-expression videos into a collection of micro-expression image frame sequence samples;

S2, extracting a set of face images from the collection of micro-expression image frame sequence samples, and performing gray-scale processing on the set of face images so as to form a set of face image sequence samples;

S3, extracting local areas of interest of the face from the set of face image sequence samples as samples for extracting local features so as to form a set of local feature samples;

S4, normalizing time scales of each of the set of face image sequence samples and the set of local feature samples to obtain a normalized set of face image sequence samples and a normalized set of local feature samples, respectively;

S5, constructing a spatiotemporal feature neural network that is formed by merging a neural network for extracting spatial features and a neural network for extracting temporal features together, and taking the normalized set of face image sequence samples and the normalized set of local feature samples as input to train the spatiotemporal feature neural network;

S6, inputting a micro-expression video to be recognized into the trained spatiotemporal feature neural network to obtain recognized micro-expressions.

In an exemplary embodiment of the present disclosure, extracting a set of face images from the collection of micro-expression image frame sequence samples is implemented through:

A first substep of S2, performing face detection on the collection of micro-expression image frame sequence samples, and cropping out rectangular face images to be zoomed in or out so as to obtain a face image sequence; and A second substep of S2: performing gray-scale normalization processing on the face image sequence, where a specific process is:

$$N(i, j) = \frac{I(i, j) - \min}{\max - \min}$$

I(i,j) and N(i,j) respectively represent a gray value of an original image of the face image sequence and a gray value of this image undergoing the gray normalization of the face image sequence, and max and min respectively represent maximum and minimum gray values of the original image of the face image sequence.

In an exemplary embodiment of the present disclosure, extracting local areas of interest of the face from the set of face image sequence samples as samples for extracting local features is implemented through:

A first substep of S3, selecting, according to face motion units, emotion labels in the set of face image sequence samples, and annotations regarding a single emotion label being associated with what face motion units, local areas where a motion amplitude exceeds a preset amplitude threshold during occurrence of a micro-expression as local areas of interest of the face; and A second substep of S3, cutting out the local areas of interest of the face from the face image sequence sample to serve as samples of local features of the micro-expression.

In an exemplary embodiment of the present disclosure, each of the emotion labels is a micro-expression annotation that has been pre-labeled on a face image sequence sample.

In an exemplary embodiment of the present disclosure, a method for normalizing the time scales is a time interpolation algorithm.

In an exemplary embodiment of the present disclosure, the constructed neural network for extracting both spatial features and temporal features is a spatiotemporal feature neural network formed of global features (i.e., an overall area of a face) and local features (i.e., local areas of interest of the face).

In an exemplary embodiment of the present disclosure, the spatiotemporal feature neural network includes: a global feature extraction layer, a local feature extraction layer, a connection layer, a fully connected layer, and an output layer, wherein the global feature extraction layer and the local feature extraction layer are connected to the connection layer, respectively, the connection layer is connected to the fully connected layer, and the fully connected layer is connected to the output layer; and wherein the global feature extraction layer includes an input layer, a three-dimensional convolution layer, a three-dimensional maximum value pooling layer, a remodeling layer, and a long and short-term memory model recurrent neural network, wherein the input layer is connected to the three-dimensional convolution layer, the three-dimensional convolution layer is connected to the three-dimensional maximum value pooling layer, the three-dimensional maximum value pooling layer is connected to the remodeling layer, and the remodeling layer is connected to the long and short-term memory model recurrent neural network; and wherein the local feature extraction layer has the same structure as that of the global feature extraction layer, but data input formats of them each may be the same or different.

In an exemplary embodiment of the present disclosure, both the three-dimensional convolution layer and the fully connected layer adopt an activation function, a specific form of which is:

$$ReLU(x) = \begin{cases} 0, x \leq 0 \\ x, x > 0 \end{cases}$$

where x is an input variable of the activation function.

In an exemplary embodiment of the present disclosure, a loss function used for training the spatiotemporal feature neural network is a cross-entropy loss function, having a specific form of, $$L = \frac{1}{N}\sum_i L_i = \frac{1}{N}\sum_i -\sum_{c=1}^{M} y_{ic}\log(P_{ic})$$

where M is the number of categories; $y_{ic}$ refers to an indicator variable, where if the current category is the same as a category of a sample i, then $y_{ic}$ is 1, otherwise it is 0; $P_{ic}$ is a predicted probability of the observed sample i belonging to the current category; and N is the number of samples.

During training, the spatiotemporal feature neural network adopts a Stochastic Gradient Descent method to calculate the loss function.

In an exemplary embodiment of the present disclosure, the training of the spatiotemporal feature neural network employs a batch normalization algorithm; during preprocessing of data, approximate whitening is adopted, a formula of which specifically is, $$\hat{x}^{(k)} = \frac{x^{(k)} - E[x^{(k)}]}{\sqrt{Var[x^{(k)}]}}$$

where $x^{(k)}$ is an input of a certain neuron in a neural network layer, $x^{(k)}$=Wh+b, W being a weight of this layer, h being an output of the last layer of the neural network layer, b being an uncertainty constant; $E[x^{(k)}]$ is a mean value of all input data in a batch of neurons of this layer under the Stochastic Gradient Descent method; and $\sqrt{Var[x^{(k)}]}$ is a standard deviation of all input data in a batch of said neuron.

According to a second aspect of the present disclosure, provided is a non-transitory computer-readable storage medium, wherein the readable storage medium stores one or more programs, which may be executed by one or more processors to implement the micro-expression recognition method based on the multi-scale spatiotemporal feature neural network as described in the first aspect of the present disclosure.

According to a third aspect of the present disclosure, provided is a computer device characterized by including a processor and a memory, wherein the memory is configured to store a computer program; the processor is configured to, when executing the computer program stored in the memory, implement the micro-expression recognition method based on the multi-scale spatiotemporal feature neural network as described in the first aspect of the present disclosure.

BRIEF DESCRIPTION OF THE DRAWINGS

The drawings here are incorporated into the specification and constitute a part of the specification, which illustrate embodiments in accordance with the present disclosure and is applicable to explain the principle of the present disclosure together with the specification.

In order to more clearly describe the technical solutions in the embodiments of the present disclosure or the existing solutions in the art, accompanying drawings needed in the description of the embodiments or the existing solutions will be briefly introduced below. Apparently, for those of ordinary skill in the art, other drawings can be obtained based on these drawings without any inventive labor involved.

In the figures: 1—global feature extraction layer, 11—input layer, 12—three-dimensional convolution layer, 13—three-dimensional maximum value pooling layer, 14—remodeling layer, 15—long and short-term memory model recurrent neural network, 2—local feature extraction layer, 21—input layer, 22—three-dimensional convolution layer, 23—three-dimensional maximum value pooling layer, 24—remodeling layer, 25—long and short-term memory model recurrent neural network, 3—connection layer, 4—fully connected layer, 5—output layer.

DETAILED DESCRIPTION OF THE EMBODIMENTS

In order to make purposes, technical solutions and advantages of the embodiments of the present disclosure more definite, the technical solutions of the embodiments of the present disclosure will be described clearly and completely below in conjunction with accompanying drawings. Apparently, the embodiments described herein merely constitute a portion, rather than the whole, of the embodiments of the present disclosure. On the basis of the embodiments of the present disclosure, all other embodiments obtained by those of ordinary skill without any inventive labor involved should fall within the protection scope of the present disclosure.

Figure 1:
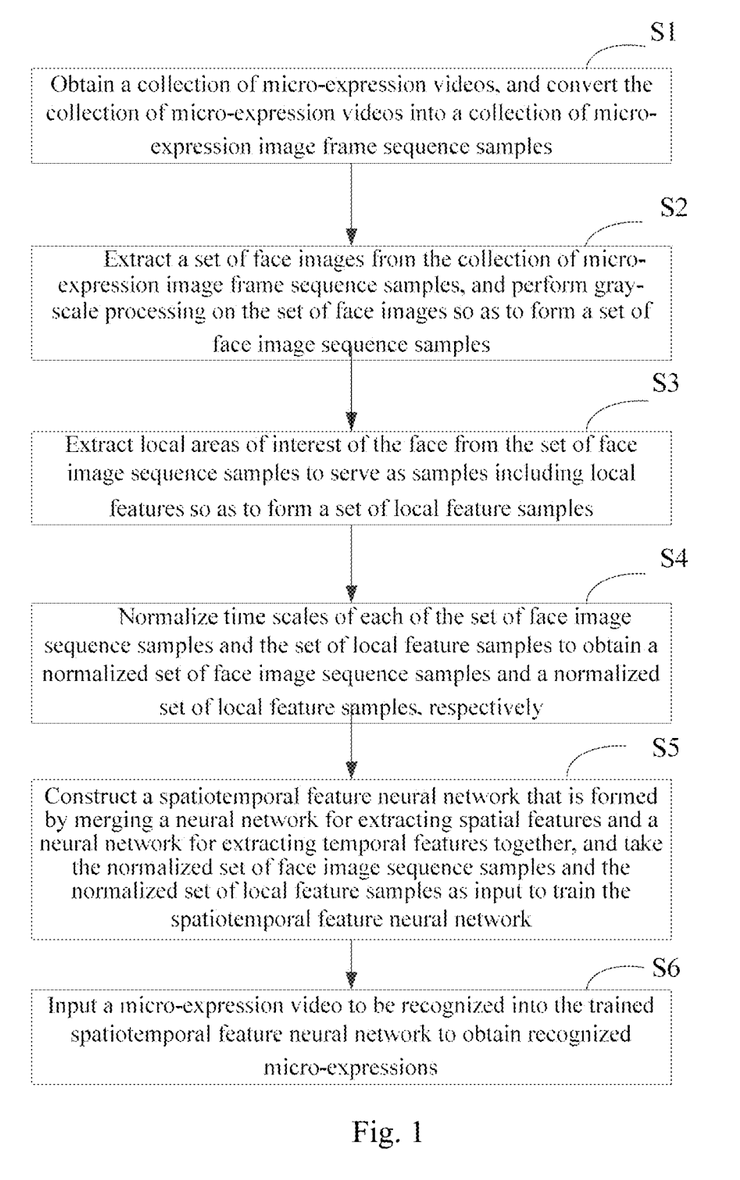
FIG. 1 is a flowchart of a micro-expression recognition method based on a multi-scale spatiotemporal feature neural network provided by an embodiment of the present disclosure.

FIG. 1 is a micro-expression recognition method based on a multi-scale spatiotemporal feature neural network provided by an embodiment of the present disclosure, which includes following steps.

In step S1, a collection of micro-expression videos is obtained and converted into a collection of micro-expression image frame sequence samples.

In step S2, a set of face images is extracted from the collection of micro-expression image frame sequence samples, and then undergoes through gray-scale processing so as to form a set of face image sequence samples. Specifically, the step S2 includes S21 and S22.

In a first substep of S2, perform face detection on the collection of micro-expression image frame sequence samples, and crop out rectangular face images to be zoomed in or out so as to obtain a face image sequence;

In a second substep of S2, gray-scale normalization is performed on the face image sequence, where a specific process is:

$$N(i, j) = \frac{I(i, j) - \min}{\max - \min}$$

I(i,j) and N(i,j) respectively represent a gray value of an original image of the face image sequence and a gray value of this image undergoing the gray normalization of the face image sequence, and max and min respectively represent maximum and minimum gray values of the original image of the face image sequence.

The face detection uses Dilb library in Python to perform face detection, and then uses dilb_cut_faces.py to cut out a detected face. Compared with other face detection approaches, the Dlib library has a smaller model and a faster running speed. A size of the obtained face is normalized to 140*120 pixels.

In step S3, local areas of interest of the face in the set of face image sequence samples are extracted as samples for extracting local features so as to form a set of local feature samples. Specifically, the step S3 includes S31 and S32.

In a first substep of S3, local areas with a relative large motion amplitude during occurrence of a micro-expression are selected as local areas of interest of the face according to face motion units, various emotion labels in the set of the face image sequence sample, and annotations regarding a single emotion label being associated with what face motion units, wherein an emotion label is a micro-expression annotation that has been pre-labeled on a face image sequence sample.

For example, an emotion label "joy" corresponds to a micro-expression "smile", and its related facial motion units include the eyes and the mouth, etc., which can be selected as local areas of interest of the face.

Figure 2:
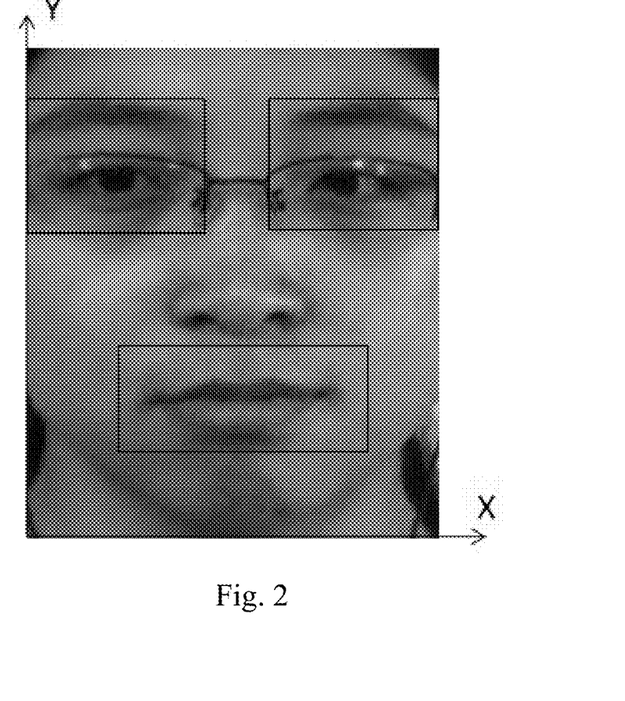
FIG. 2 is a schematic diagram showing a cut-off partial area according to an exemplary embodiment.

In a second substep of S3, the local areas of interest of the face are cut out from the face image sequence sample to serve as samples of local features of the micro-expression, and thereby clearly divided areas of interest (eyes, mouth) are obtain. An example of the divided areas of interest is shown in FIG. 2, where a pixel size of eye area is, for example, 50*40, and a size of mouth area is, for example, 30*80.

In step S4, time scales of each of the set of face image sequence samples and the set of local feature samples are normalized by using a time interpolation algorithm to obtain a normalized set of face image sequence samples and a normalized set of local feature samples, respectively.

In step S5, a spatiotemporal feature neural network is established by merging a neural network for extracting spatial features and a neural network for extracting temporal features together, and the spatiotemporal feature neural network is formed of global features (i.e., on an overall area of a face) and local features (i.e., on local areas of interest of the face); and the normalized set of face image sequence samples (i.e., the global features) and the normalized set of local feature samples (i.e., the local features) serve as input to train the spatiotemporal feature neural network.

Figure 3:
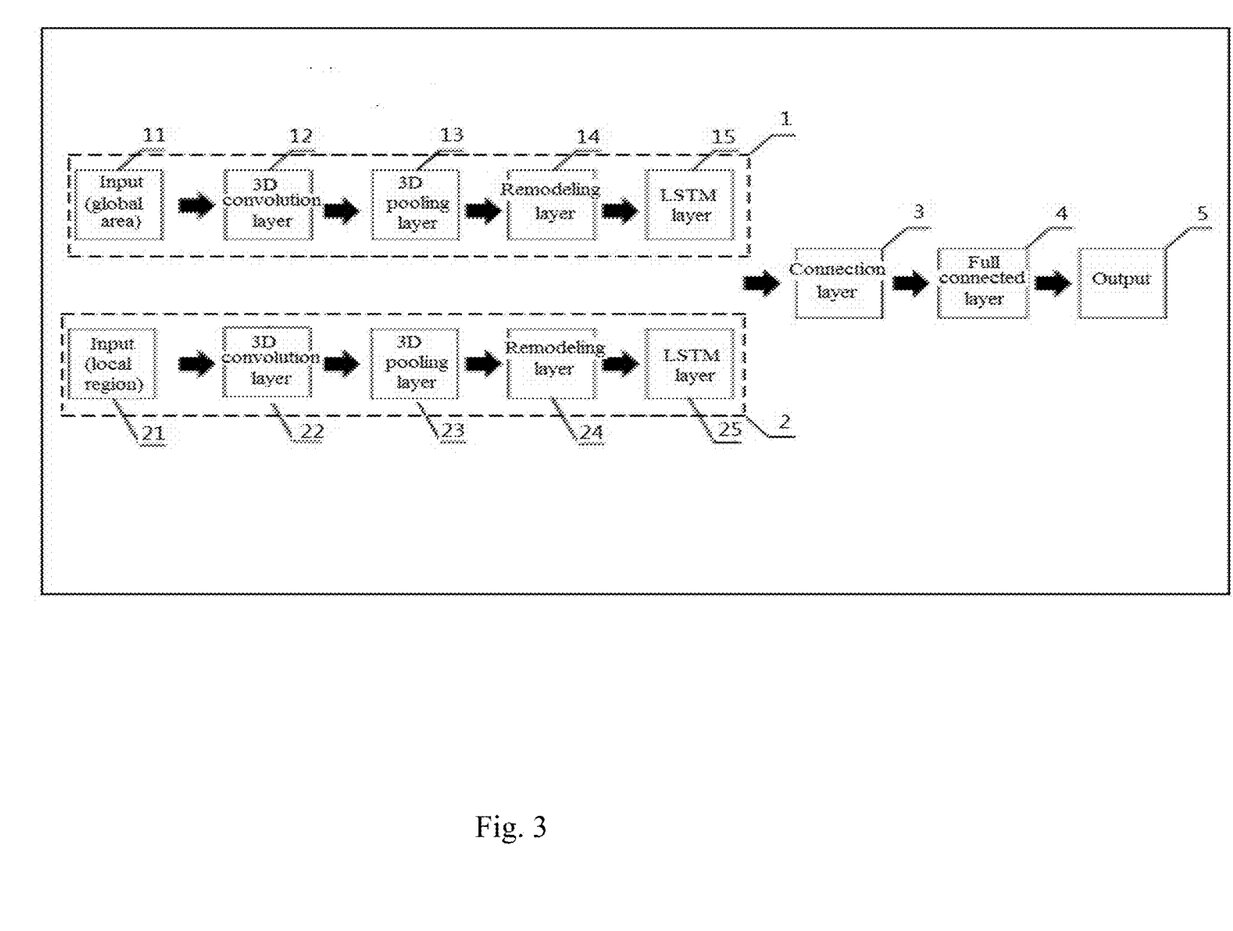
FIG. 3 is a block diagram showing network structure of a spatiotemporal feature neural network according to an exemplary embodiment.

The spatiotemporal feature neural network includes: a global feature extraction layer 1, a local feature extraction layer 2, a connection layer 3, a fully connected layer 4, and an output layer 5. The global feature extraction layer 1 and the local feature extraction layer 2 are connected to the connection layer 3, respectively, and the connection layer 3 is connected to the fully connected layer 4, and the fully connected layer 4 is connected to the output layer 5. The global feature extraction layer 1 includes an input layer 11, a three-dimensional convolution layer 12, a three-dimensional maximum value pooling layer 13, a remodeling layer 14, and a long and short-term memory model recurrent neural network 15. The input layer 11 is connected to the three-dimensional convolution layer 12, the three-dimensional convolution layer 12 is connected to the three-dimensional maximum value pooling layer 13, the three-dimensional maximum value pooling layer 13 is connected to the remodeling layer 14, and the remodeling layer 14 is connected to the long and short-term memory model recurrent neural network 15. In this case, the local feature extraction layer 2 has the same structure as that of the global feature extraction layer 1, but data input formats of them each may be the same or different.

It can be seen from FIG. 3 that in the spatiotemporal feature neural network, the local and global features of the micro-expression are aggregated through the connection layer, and then a prediction result of the micro-expression is obtained through a plurality of fully connected layers. Further, during both of extraction of the local features through the local feature extraction layer and extraction of the global features through the global features layer, three-dimensional convolution and LSTM are adopted and multiple frames of images are involved so that the extracted local features have corresponding time characteristics with the global features.

Both the three-dimensional convolution layer 12 and the fully connected layer 4 employ an activation function to improve expressiveness of the model. A specific form of the activation function is:

$$ReLU(x) = \begin{cases} 0, x \leq 0 \\ x, x > 0 \end{cases}$$

where x is an input variable of the activation function.

A three-dimensional convolutional neural network is used to extract the spatial features from multiple micro-expression video frame sequences to obtain the spatial features of the micro-expression. Compared with traditional recognition methods, the convolutional neural network (CNN) technology requires neither a complicated feature extraction process nor a data reconstruction process.

The long and short-term memory model recurrent neural network (LSTM) extracts relevant time dimension characteristics from each extracted video frame. The LSTM is a network improved based on a recurrent neural network (RNN), and emergence of the LSTM brings about breakthrough development on learning of sequence features. The LSTM has a time loop structure, which can well describe the sequence data having spatiotemporal correlation. By means of the LSTM, micro-expression time information features having spatiotemporal correlation can be further obtained on the basis of primary time sequence features obtained by the above-mentioned three-dimensional convolutional network.

The spatiotemporal features extracted through each channel are aggregated together to form micro-expression spatiotemporal features.

A loss function used for training the spatiotemporal feature neural network is a cross-entropy loss function, having a specific form of, $$L = \frac{1}{N}\sum_i L_i = \frac{1}{N}\sum_i -\sum_{c=1}^{M} y_{ic}\log(P_{ic})$$

where M is the number of categories; $y_{ic}$ refers to an indicator variable, where if the current category is the same as a category of a sample i, then $y_{ic}$ is 1, otherwise it is 0; $P_{ic}$ is a predicted probability of the observed sample i belonging to the current category; and N is the number of samples.

Features corresponding to each channel are used as input to train the neural network. During training, a Stochastic Gradient Descent method is used to calculate the loss function. Stochastic Gradient Descent obtains a corresponding gradient by taking the partial derivative of the loss function of each sample, and is iteratively updated once through each sample.

While the neural network is training, network parameter values are set as below: a size of each convolution kernel of the convolution layer is 3*3*3, and a total number of 16 convolution kernels are set; for the maximum pooling layer, a size of maximum pooling layer window is 3*3*3; a parameter of the LSTM layer are set to 512, a learning rate is set to 0.01, and batch_size is 16.

While the neural network model is training, phenomenon of over-fitting is easy to be resulted due to a micro-expression data set being relative small. In order to prevent over-fitting, Dropout algorithm is used. In each batch of training, some parameters are appropriately ignored to reduce their interaction with one another so that the phenomenon of over-fitting can be significantly depressed, and the model can have better generalization ability. A parameter of the Dropout is set to 0.5.

The training employs a batch normalization algorithm; during preprocessing of data, approximate whitening is adopted, a formula of which specifically is, $$\hat{x}^{(k)} = \frac{x^{(k)} - E[x^{(k)}]}{\sqrt{Var[x^{(k)}]}}$$

where $x^{(k)}$ is an input of a certain neuron in a neural network layer, $x^{(k)}$=Wh+b, W being a weight of this layer, h being an output of the upper layer of this layer, b being an uncertainty constant; $E[x^{(k)}]$ is a mean value of all input data in a batch of neurons of this layer under the Stochastic Gradient Descent method; and $\sqrt{Var[x^{(k)}]}$ is a standard deviation of all input data in a batch of said neuron.

In step S6, a micro-expression video to be recognized is input into the trained spatiotemporal feature neural network to obtain recognized micro-expressions.

The specific embodiment described above adopts CASMEII database, which is a public data set about spontaneous micro-expressions released by the Chinese Academy of Sciences. This embodiment is tested through the CASMEII database, the spontaneous micro-expression data set of which is widely used in tasks of classification of spontaneous micro-expressions. The data set includes a total of 255 micro-expression sequences of 26 subjects. A frame rate of a camera collecting the data set is 200 frame/s, and an image resolution is 280 pixels*340 pixels. All samples are spontaneous. This data set includes a total of 7 categories, namely Disgust, Happiness, Surprise, Repression, Sadness, Fear, and Others. To verify that the present disclosure is effective on micro-expression recognition, 80% videos of the database are randomly selected for experiment.

Experimental results show that an accuracy rate of the micro-expression recognition can reach 78.7%, which fully indicates that, compared with other methods, the above method has certain advantages, and a good result can be achieved by using this method for recognizing micro-expressions.

In the method provided by the embodiments of the present disclosure, temporal features are combined with spatial features so that the problem of insufficient feature extraction between consecutive frames of a micro-expression video can be solved. In addition, in the method provided by the embodiments of the present disclosure, with respect to situations where micro-expressions usually occur or are relatively active in local facial areas, an overall facial area of a human face is used as global information and local facial areas of interest (for example, a area in which motion amplitude exceeds a certain amplitude threshold) are used as local information, and extraction of micro-expression features are implemented by combining the local information with the global information, which improves the accuracy of spontaneous micro-expression recognition. Compared with other methods, certain advantages have been revealed, and an accuracy rate of 78.7% can fully indicate that a good result of recognition of micro-expressions is achieved through the present disclosure.

On the basis of the foregoing embodiments, an embodiment of the present disclosure provides a readable storage medium, wherein the readable storage medium stores one or more programs, which may be executed by one or more processors to implement the micro-expression recognition method based on the multi-scale spatiotemporal feature neural network as described in the foregoing embodiments.

Optionally, the aforementioned storage medium may be a non-transitory computer-readable storage medium. For example, the non-transitory computer-readable storage medium may be ROM, random access memory (RAM), CD-ROM, magnetic tape, floppy disk, and optical data storage device, etc.

Figure 4:
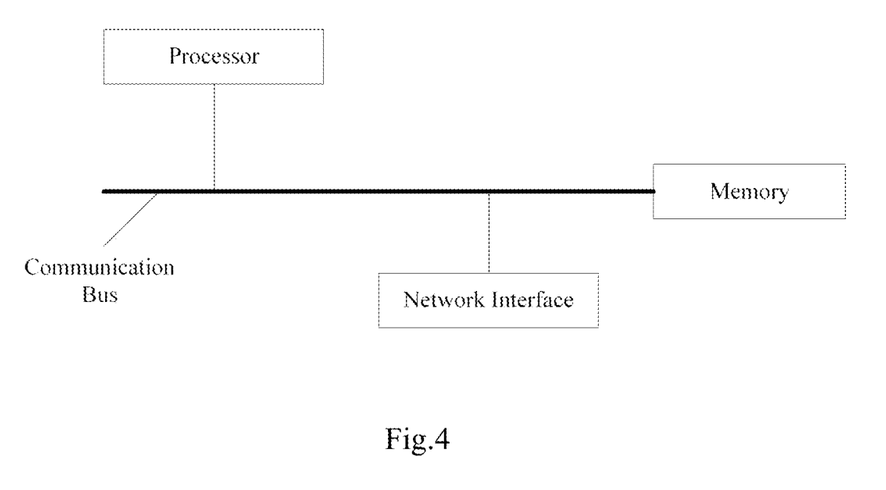
FIG. 4 is a schematic diagram showing composition structure of a computer device according to an exemplary embodiment.

In addition, as shown in FIG. 4, another embodiment of the present disclosure further provides a computer device, including a processor and a memory;

the memory is configured to store a computer program;

the processor is configured to execute the computer program stored in the memory to implement the micro-expression recognition method based on the multi-scale spatiotemporal feature neural network as described in the foregoing embodiments.

The aforementioned processor may be a general-purpose processor, including a Central Processing Unit (CPU), a Network Processor (NP), etc. It may also be a Digital Signal Processor (DSP), Application Specific Integrated Circuit (ASIC), Field-Programmable Gate Array (FPGA) or other programmable logic devices, discrete gates or transistor logic devices, discrete hardware components.

It should be noted that, in this document, relational terms such as "first" and "second" are merely used to distinguish one entity or operation from another entity or operation, and do not intent to require or imply any such actual relationship or sequence between these entities or operations. Moreover, wordings "include", "comprise" or any other variants thereof are intended to cover non-exclusive inclusion, so that a process, method, article or device including a series of elements not only includes those elements, but also include other elements that have not been listed definitely or elements inherent to the process, method, article, or device. Except that there is further limitation, an element defined by the wordings, such as "include a . . . " does not exclude existence of other identical elements included in the process, method, article, or device including said element.

These above are only specific embodiments of the present disclosure to facilitate understanding or implementation of the present disclosure by those skilled in the art. Various modifications to these embodiments will be apparent to those skilled in the art, and the general principles defined herein can be implemented in other embodiments without departing from the spirit or scope of the present disclosure. Therefore, the present disclosure will not be limited to the embodiments illustrated in this document, but should conform to the broadest scope consistent with the principles and novel features provided in this document.

What is claimed is:

1. A micro-expression recognition method based on a multi-scale spatiotemporal feature neural network, comprising steps of:
    S1, obtaining a collection of micro-expression videos, and converting the collection of micro-expression videos into a collection of micro-expression image frame sequence samples;
    S2, extracting a set of face images from the collection of micro-expression image frame sequence samples, and performing gray-scale processing on the set of face images so as to form a set of face image sequence samples, wherein a face image in the set of face image sequence samples include an overall area of a human face;
    S3, extracting local areas of interest of the face from the set of face image sequence samples to serve as samples including local features so as to form a set of local feature samples;
    S4, normalizing time scales of each of the set of face image sequence samples and the set of local feature samples to obtain a normalized set of face image sequence samples and a normalized set of local feature samples, respectively;
    S5, constructing a spatiotemporal feature neural network that is formed by merging a neural network for extracting spatial features and a neural network for extracting temporal features together, and taking the normalized set of face image sequence samples and the normalized set of local feature samples as input to train the spatiotemporal feature neural network so as to obtain a trained spatiotemporal feature neural network; and
    S6, inputting a micro-expression video to be recognized into the trained spatiotemporal feature neural network to obtain recognized micro-expressions,
    wherein the spatiotemporal feature neural network comprises a global feature extraction layer, a local feature extraction layer, a connection layer, a fully connected layer, and an output layer, wherein the global feature extraction layer and the local feature extraction layer are connected to the connection layer, respectively, the connection layer is connected to the fully connected layer, and the fully connected layer is connected to the output layer; and wherein each of the global feature extraction layer and the local feature extraction layer includes an input layer, a three-dimensional convolution layer, a three-dimensional maximum value pooling layer, a remodeling layer, and a long and short-term memory model recurrent neural network, which are connected to on another in sequence; and wherein global features of the spatiotemporal feature neural network relate to the overall area of the face, and local features of the spatiotemporal feature neural network relate to local areas of interest of the face.

2. The method according to claim 1, wherein the step S2 includes steps of:
    S21, performing face detection on the collection of micro-expression image frame sequence samples, and cropping out rectangular face images to be zoomed in or out so as to obtain a face image sequence; and
    S22: performing gray-scale normalization processing on the face image sequence according to a formula, $$N(i, j) = \frac{I(i, j) - \min}{\max - \min}$$

wherein I(i,j) and N(i,j) respectively represent a gray value of an original image of the face image sequence and a gray value of the image undergoing the gray normalization of the face image sequence, and max and min respectively represent maximum and minimum gray values of the original image of the face image sequence.

3. The method according to claim 1, wherein the step S3 includes steps of:

S31, selecting, according to face motion units, emotion labels in the set of face image sequence samples, and annotations regarding a single emotion label being associated with what face motion units, local areas where a motion amplitude exceeds a preset amplitude threshold during occurrence of a micro-expression as local areas of interest of the face; and S32, cutting out the local areas of interest of the face from face images in the set of face image sequence samples to serve as samples including the local features of micro-expressions.

4. The method according to claim 3, wherein each of the emotion labels is a micro-expression annotation that has been pre-labeled on a face image sequence sample.

5. The method according to claim 1, wherein the time scales of each of the set of face image sequence samples and the set of local feature samples is normalized by using a time interpolation algorithm.

6. The method according to claim 1, wherein the three-dimensional convolution layer and the fully connected layer each uses an activation function, $$ReLU(x) = \begin{cases} 0, & x \leq 0 \\ x, & x > 0 \end{cases}$$

where x is an input variable of the activation function.

7. The method according to claim 1, wherein a loss function used for training the spatiotemporal feature neural network is a cross-entropy loss function, $$L = \frac{1}{N}\sum_i L_i = \frac{1}{N}\sum_i -\sum_{c=1}^{M} y_{ic} \log(P_{ic})$$

where M is a quantity of categories; $y_{ic}$ refers to an indicator variable, where if a current category is same as a category of an observed sample i, then $y_{ic}$ is 1, otherwise $y_{ic}$ is 0; $P_{ic}$ is a predicted probability of the observed sample i belonging to the current category; and N is a quantity of samples; and wherein a Stochastic Gradient Descent method is used to calculate the loss function during training of the spatiotemporal feature neural network.

8. The method according to claim 7, wherein a batch normalization algorithm is used during training of the spatiotemporal feature neural network; in the batch normalization algorithm, approximate whitening is performed by using a formula, $$\hat{x}^{(k)} = \frac{x^{(k)} - E[x^{(k)}]}{\sqrt{Var[x^{(k)}]}}$$

where $x^{(k)}$ is an input of a certain neuron in a neural network layer, $x^{(k)}$=Wh+b, W being a weight of the neural network layer, h being an output of the upper layer of the neural network layer, b being an uncertainty constant; $E[x^{(k)}]$ is a mean value of all input data in a batch of neurons of the neural network layer under the Stochastic Gradient Descent method; and $\sqrt{Var[x^{(k)}]}$ is a standard deviation of all input data in a batch of said neuron.

9. A non-transitory computer-readable storage medium storing one or more programs thereon, wherein the one or more programs can be executed by one or more processors to implement the micro-expression recognition method based on the multi-scale spatiotemporal feature neural network according to claim 1.

10. A computer device comprising a processor and a memory, wherein the memory is configured to store a computer program; the processor is configured to, when executing the computer program stored in the memory, implement the micro-expression recognition method based on the multi-scale spatiotemporal feature neural network according to claim 1.

* * * * *